United States Patent
Land

(10) Patent No.: US 7,135,672 B2
(45) Date of Patent: Nov. 14, 2006

(54) FLASH LADAR SYSTEM

(75) Inventor: Jay E. Land, Owens Cross Roads, AL (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 64 days.

(21) Appl. No.: 11/017,543

(22) Filed: Dec. 20, 2004

(65) Prior Publication Data

US 2006/0131486 A1  Jun. 22, 2006

(51) Int. Cl.
*H01L 27/00* (2006.01)

(52) U.S. Cl. ............... 250/221; 356/5.01; 356/5.1; 250/208.6; 382/106

(58) Field of Classification Search .......... 250/221; 356/5.01, 5.1
See application file for complete search history.

(56) References Cited

U.S. PATENT DOCUMENTS

| | | | |
|---|---|---|---|
| 5,074,673 A * | 12/1991 | Sowell et al. | 356/5.01 |
| 5,202,742 A * | 4/1993 | Frank et al. | 356/5.1 |
| 5,539,199 A * | 7/1996 | Ruckh et al. | 250/222.1 |
| 6,084,659 A * | 7/2000 | Tulet et al. | 356/5.01 |
| 6,381,007 B1 * | 4/2002 | Fabre et al. | 356/28.5 |
| 6,392,747 B1 | 5/2002 | Allen et al. | |
| 6,522,396 B1 | 2/2003 | Halmos | |
| 6,879,384 B1 * | 4/2005 | Riegl et al. | 356/5.01 |
| 6,924,887 B1 * | 8/2005 | Dosluoglu et al. | 356/5.01 |

FOREIGN PATENT DOCUMENTS

GB  2382666 A  6/2003

* cited by examiner

*Primary Examiner*—Thanh X. Luu
*Assistant Examiner*—Stephen Yam
(74) *Attorney, Agent, or Firm*—Michael K. Gray

(57) ABSTRACT

A flash ladar system has a laser provided with beam focusing optics for directing a laser fan beam pulse to a scanning element that in turn directs the laser fan beam to a vertical region of space. Light reflected from an object in the vertical region of space is directed by a reflecting element to a sensor provided with a column of photosensitive pixels that connects to a charge storage matrix of non-photosensitive pixels. After an integration period electrical charges are shifted from the photosensitive region to an adjacent column in the charge storage region. The process of integrate and shift is repeated for multiple integration periods until the charge storage region is filled with charges whereupon a serial shift register removes the information to be processed by a data processor.

11 Claims, 3 Drawing Sheets

FLASH LADAR SYSTEM

The invention described herein may be manufactured, used and licensed by or for the U.S. Government for governmental purposes without payment of any royalties thereon.

BACKGROUND OF THE INVENTION

1. Field of the Invention

The present invention pertains generally to devices used to measure the distance to an object. More particularly, the present invention pertains to a radar system that utilizes a class of laser radar sensors known as "flash" ladar sensors.

Conventional flash radar sensors use a single laser pulse to measure range to multiple spatial positions. In the present invention, the time delay of light reflected from a succession of laser pulses is measured. The laser pulses are generated at different intervals of an azimuth angle with each pulse lasting for a predetermined interval of time. By processing the signals received during each laser pulse, the range, elevation and angle of an object can be quantified in real time. The present invention uses established charge coupled device (CCD) imaging technology in a novel architecture that improves the speed of pure scanning ladar sensors at a considerable reduction in cost and complexity.

2. Background of the Invention

Ordinarily, the term "Flash Ladar Sensor" refers to an electronic sensor that generates a three-dimensional range profile from the scattered light of a single transmitted laser pulse.

To date, work has been focused on generating a full two-dimensional range image of a region of interest by flood illuminating the region with a single laser pulse and optically capturing the reflected energy on a two-dimensional photosensitive pixel array. These prior art photosensitive pixel arrays require time delay measurement circuitry for each pixel of the array. Considering the already high level of circuit integration that had been used with imaging arrays, the addition of time delay measurement circuitry on a pixel by pixel basis has led to a host of design and manufacturing complexities. Still further, prior art flash ladar designs require very high energy laser pulses in order to flood illuminate a relatively large volume of space.

Instead of building time delay measurement circuitry into each unit cell of the array, the sensor of the present invention uses similar technology and circuitry to that employed with conventional full frame transfer CCD imaging chips.

The pixel array of the full-frame CCD consists of a photosensitive parallel shift register onto which images are optically projected by means of a camera lens. In the full-frame CCD, all of the photodiodes in the two dimensional pixel array collectively act as the image plane and are available for detecting photons during the exposure period.

The information contained in each pixel element of the full-frame CCD represents a small portion of the total projected image. For color imaging, each of the pixel elements would contain four photodiodes masked with red, green and blue colored filters. For monochrome imaging, a single photodiode is used.

After photons composing the image have been collected by the pixel elements and converted into electrical potential, the CCD undergoes readout by shifting rows of image information in a parallel fashion, one row at a time, to a serial shift register. The serial register then sequentially shifts each row of image information to an output amplifier as a serial data stream. The entire process is repeated until all rows of image data are transferred to the output amplifier and off the chip to an analog to digital signal converter integrated circuit. Reconstruction of the image in a digital format yields the final photograph.

The present invention does not pertain to imaging photography; it is concerned with ascertaining the range of an object from the sensor. Unlike the conventional CCD imaging chip that requires all of its pixels to be photosensitive, in the present invention the pixels of the CCD pixel array are all masked except for one column of photosensitive pixels. The masked pixels are used as a charge storage memory area.

In the conventional CCD imaging chip, all of the pixels are used to integrate photo-charge for a relatively long integration period (greater than 1 micro second) after which a shutter is closed and the charge from the entire array is read out.

By contrast, the present invention does not utilize a shutter and the charge is transferred at a very fast rate (on the order of 10 nanoseconds) while photo-charge is continually integrated on the photosensitive portion of the array. This chip architecture allows the charge storage region of the present invention to retain a time history profile of reflected light.

A high speed imaging device made by DRS Hadland, LTD used for ballistic imaging uses a dimensional imaging array in which only one pixel is unmasked out of a combined pixel group or superpixel (i.e., each superpixel may consist of a 4×4 pixel section of the array). In this type of camera, a fast succession of images are taken by shifting the charge from each photosensitive pixel within the other pixels of its superpixel group so that images of a high speed event are captured. The DRS Hadland, LTD device employs the concept of shifting charge in a masked pixel for producing a two-dimensional image but cannot be used to determine the range of an object.

SUMMARY OF THE INVENTION

Acccordingly, one object of the invention is to provide a flash ladar radar system of simplified design.

Another object of the present invention is to provide a flash ladar radar system that is economical to manufacture.

Another object of the present invention is to provide a flash ladar system that can generate accurate signal information relating to an object's range, elevation and angle.

Still another object of the present invention is to provide a flash ladar radar system that can be used in conjunction with lower energy laser pulses than those required by the prior art.

These and other objects and advantages of the invention are realized by a flash ladar system having a laser for generating a fan-beam pulse. An optical arrangement is provided for directing the fan beam at a desired focal length. Scanning means receive the fan beam pulse form the optical arrangement and direct the fan-beam pulse to a calibrated vertical strip of space. A reflecting means reflects light resulting from the fan beam striking an object to a sensor. The sensor has a photosensitive region oriented with a singular axis manifested by a column of photosensitive pixels. Alternatively, the photosensitive region of the sensor can be manifested by arched photosensitive paths located at respective radial distances from a radial focal point.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
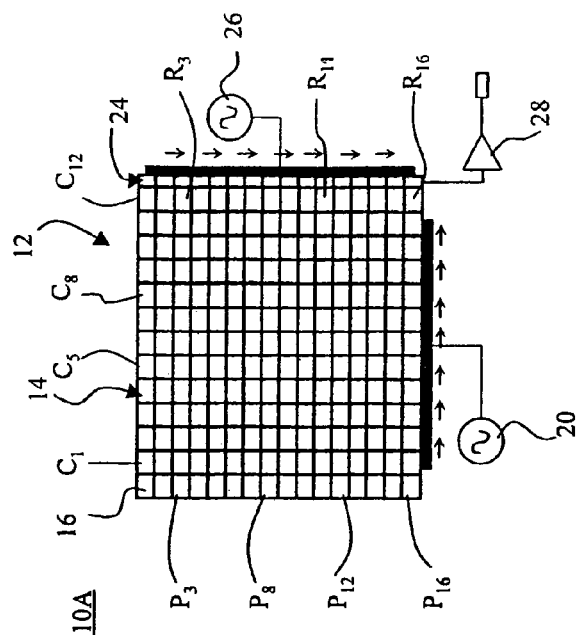
FIG. 1 is a schematic illustration of the CCD sensor having a column of photosensitive pixels according to one embodiment of the present invention.

Referring now to the drawings wherein like reference numerals represent like or corresponding parts in each of the several figures, and more particularly to FIG. 1 thereof, a sensor 10A is provided with a charge storage matrix or array 12 having columns and rows of charge storage pixels 14.

In FIG. 1, the reference character $C_1$ represents the first column of charge storage pixels, the reference character $C_5$ represents the fifth column of charge storage pixels, the reference character $C_8$ represents the eighth column of charge storage pixels and the reference character $C_{12}$ represents the twelfth or last column of charge storage pixels. The columns of charge storage pixels may be viewed as range bins.

The third row of charge storage pixels is indicated by reference character $R_3$, the eleventh row of charge storage pixels is indicated by reference character $R_{11}$, and the last or sixteenth row of charge storage pixels is represented by reference character $R_{16}$.

A photosensitive region 16 is a singular column of respective photosensitive pixels positioned one on top of another. Reference characters $P_3$, $P_8$, $P_{12}$, and $P_{16}$ represent the third, eighth, twelfth, and sixteenth photosensitive pixels in photosensitive column 16. Each of the photosensitive pixels connects to a corresponding row of charge storage pixels in the charge storage matrix by being directly connected to a corresponding charge storage pixel in the first column of the charge storage matrix. Thus, photosensitive pixel $P_3$ directly connects to the charge storage pixel located in the first column and third row of the charge storage matrix, and photosensitive pixel $P_{16}$ directly connects to the charge storage pixel in the first column and last row of the charge storage matrix.

The photosensitive pixels are photosites that convert photons to an electrical charge. Each photosensitive pixel can be viewed as a path that leads the converted light energy to a respective row of the charge storage matrix. After a laser pulse, the photons from the light reflected as a result of a laser beam striking an object are received by the photosensitive pixels of the photosensitive column 16.

The photons received by each photosensitive pixel are converted to an integrated electrical charge over an integration period and are then transferred (shifted) from the photosensitive column to the first column of the charge storage matrix.

After each integration period of a plurality of integration periods, the integrated charges collected in the photosensitive column are shifted to the first column of the charge storage matrix and the charges which were contained in the first column are shifted to the second column of the charge storage matrix. This process of integration and transfer continues over a succession of integration periods until all of the columns of the charge storage region are full of charges and the charges from the first integration period are resident in the last column of the charge storage matrix. When the charge storage region is full of charges, the charges from the first integration period are then extracted (shifted) from the last column of the charge storage matrix 12 and the charges from the second integration period enter the last column and are then extracted therefrom. The process of shifting the charges to the last column and extracting the charges is repeated until all of the charges have been extracted from the sensor 10a.

The shifting of charges from one column to the next adjacent column is accomplished due to the fact that the sensor 10a is a charge coupled device (CCD) in which the array 12 of charge storage pixels act as a parallel shift register 24. A line charge transfer clock 20 connected to the array 12 activates or opens gates in the pixels so that after each integration period, the charge contained in a charge storage column is shifted to the next column. (The gates and associated logic circuitry are not shown in the drawings but are similar to that of conventional full frame transfer imaging chips).

Once the charge storage region is full, a serial output shift register 24 connected to the last the last column of the charge storage matrix 12 and having an output shift register clock 26 extracts the charges from the last column row by row whereupon the charges from the next-to-last column are shifted into the last column and are then extracted. This process is repeated until all the columns of charges have been extracted and removed from the sensor 10a.

After leaving the shift register 24, the charges are received by an output amplifier 28 and sent on to a data processor. A single output amplifier is shown in FIG. 2 for purposes of reading out the data from the sensor; however, multiple amplifiers could be used to read out subsections of the output shift registers in parallel thereby increasing the data output rate.

Figure 2:
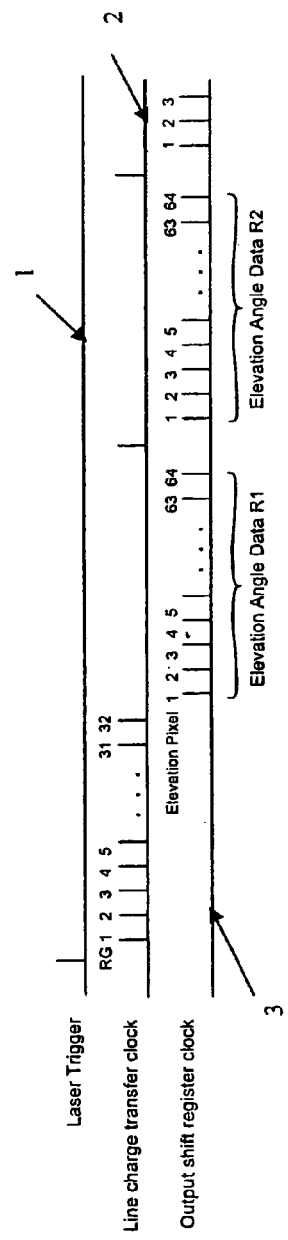
FIG. 2 is a timing diagram of the line charge transfer clock and output shift register clock of the sensor of the present invention.

FIG. 2 shows the timing for the two timer clocks 20, 26 of the present invention in an example where the sensor contains 64 photosensitive pixels (i.e., 64 elevation pixels) and the charge storage region has 32 columns (i.e., 32 range bins). Timing is shown for a single laser pulse through the charge storage filling period and throughout the readout of the first two range bins.

The top trace 1 shows a trigger which is synchronous to the transmission of the outgoing laser pulse. The second trace 2 shows the clock that would be used for clocking the line charge from the photosensitive column into the charge storage region and for clocking the columns of the charge storage region so as to allow shifting after each integration period. The third trace 3 shows the clock signal used for clocking the data out of the output shift register 24.

With reference to FIG. 2, virtually instantaneously after the transmission of a laser pulse, the photo-generated charge is integrated on the photosensitive column. At the end of an integration period, the integrated charge is shifted into the charge storage region and all columns of the charge storage region are simultaneously shifted by one column. This cycle of integrate and shift is repeated for 32 cycles in the example of FIG. 2 until all of the columns of the charge storage region are full. At this point of time, the earliest column of integrated charge (from the first integration period) resides at the right most column of the sensor 10a and within the output shift register 24. The data is then read out of the output shift register one pixel at a time by the output shift register clock—once for each pixel (64 times in the example of FIG. 2).

Once the last column is emptied, the charge storage region is shifted by one column to the right which places the column of integrated charge from the second integration period in the output shift register to be read out in the same manner as the information from the first integration period.

The process of charge storage column shift followed by output shift register clocking is repeated until the entire charge storage region (representing 32 integration periods of collected charges) has been read out.

Figure 3:
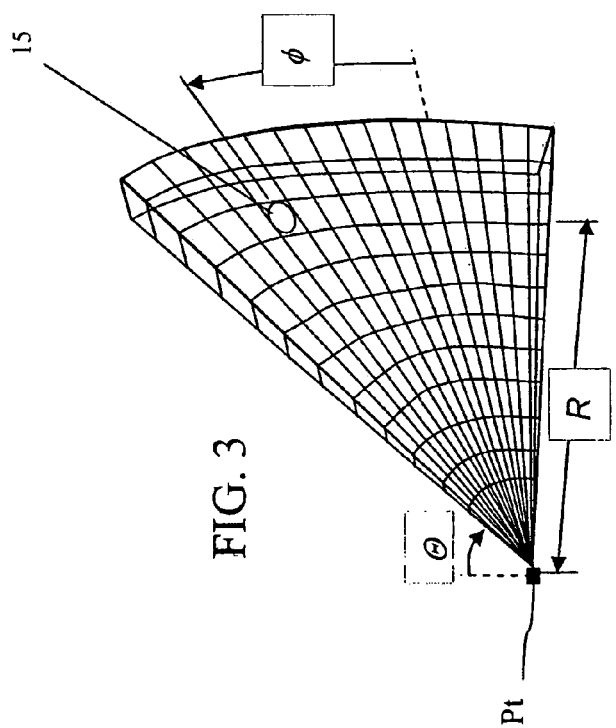
FIG. 3 is a graphical diagram showing the azimuth angle Θ, range R, and elevation angle φ of an object located in a scanned wedge of space from a sensor according to the present invention.

In FIG. 3, an object is shown to be in the wedge-shaped slice of space that represents the vertical strip of space projected upon by a fan-beam laser pulse. The object 15 is located at a range R, elevation azimuth angle Θ, and elevation angle φ from a reference point Pt. The range, elevation and angle are the three elements of information that are sent from the sensor to be processed. After the charge storage region of the sensor has been filled and then emptied, the sensor is ready for the laser to generate another laser pulse. For the sensor 10a (FIG. 1), the sensor field of view will be rotated to an adjacent azimuth position by means of a mechanical rotary scanning mechanism and the entire process will be repeated. This process will continue over a series of laser pulses until the full azimuth angle has been scanned.

The sensor's field of view is constrained to a three-dimensional volume lying in front of the sensor bounded by a minimum and maximum range, a small angular subtense in one cross range dimension and a larger angular subtense in the orthogonal cross range dimension.

In that the sensors field of view is oriented vertically, the field of view is scanned in the horizontal plane to build up a full two dimensional range profile using multiple laser pulses.

Figure 4:
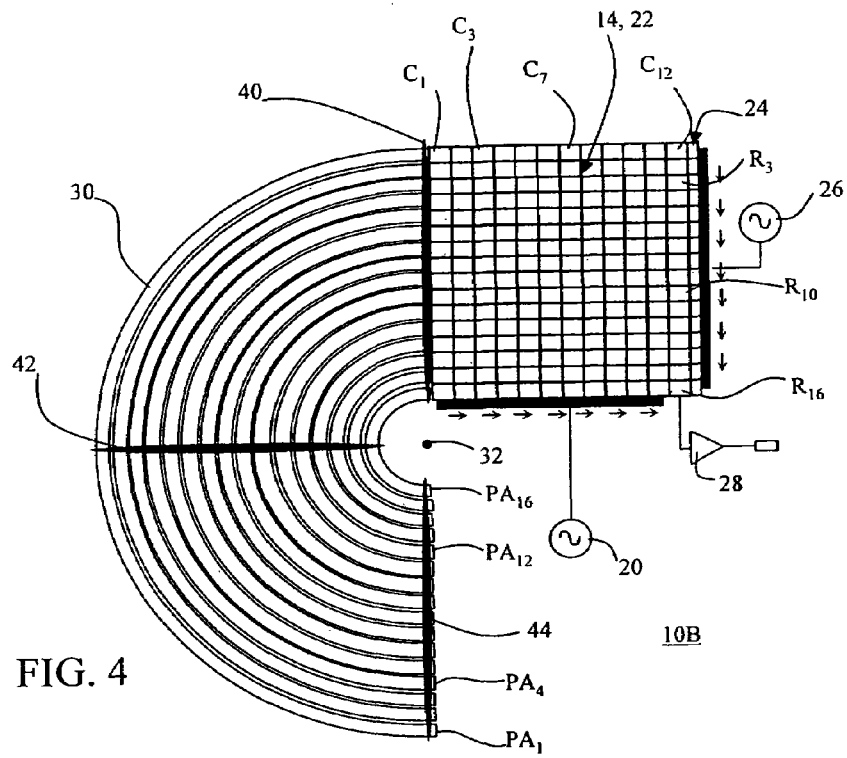
FIG. 4 is a schematic illustration of a sensor, according to a second embodiment of the present invention, having a radial or arched photosensitive region.

In FIG. 4, a sensor 10b according to a second embodiment of the invention has an arched photosensitive region 30. Sensor 10b is essentially the same as sensor 10a of FIG. 1 except that the photosensitive column 16 has been replaced with the arched photosensitive region 30. The shape of the photosensitive pixels in FIG. 4 has been changed to respective 180 degree arcs. Photosensitive region 30 has a plurality of photosensitive arcs of finite width as opposed to the square pixels of FIG. 1. This arched pixel geometry necessitates that the pixels have widths that allow for low capacitance and fast detector response times.

Reference characters $PA_1$, $PA_4$, $PA_{12}$, and $PA_{16}$ represent the respective photosensitive arcs that are positioned at respective radial distances from a radial focal point 32. The photosensitive arcs are radial photosensitive paths that collect photons and convert the photonic light energy to an electrical charge over an integration period in the same manner as performed by the photosensitive pixels of the photosensitive column 16 of FIG. 1.

However, since the photosensitive arcs extend for 180°, it is not necessary to rotate the sensor 10b to different azimuth positions. Reference line 40 indicates the angular position of the photosensitive arcs where the fan beam image is at a +90° scan angle. Reference line 42 indicates the angular position of the arcs when the fan beam image is at 0° scan angle and reference line 44 indicates the angular position of the photosensitive arcs when the fan beam image is at −90° scan angle.

The photosensitive arcs directly connect to corresponding rows of column $C_1$, of the charge storage matrix 12. The charge storage matrix is the same as and operates in identical fashion to the charge storage matrix of FIG. 1.

Figure 5:
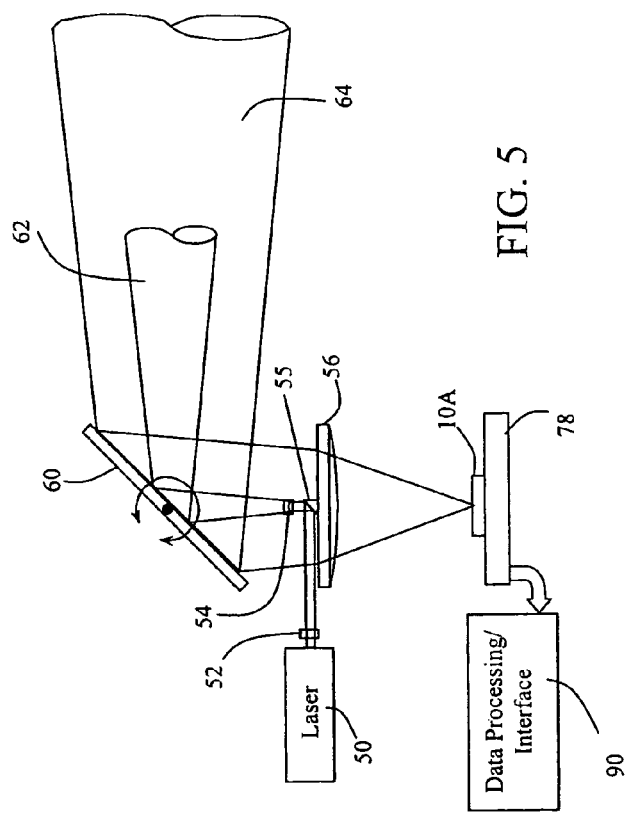
FIG. 5 is a schematic illustration of a first flash ladar system according to the present invention.

With reference to FIG. 5, a scanning system having a laser 50 projects a laser beam through optical lens 52. The beam is then reflected by optical member 55 through optical element 54 and focused onto a galvanometer driven scan mirror 60 or rotating polygonal mirror. A wedge-shaped fan beam 62 is transmitted from the scan mirror.

The sensor chip 10a has a received field of view (FOV) 64 which reflects from the scanner mirror and through imaging optics 56 such that any reflected light energy is directed to the sensor 10a. A filter (not shown) would filter the light before it reaches the sensor 10a.

The length-wise dimension or axis of transmitted beam 62 lies perpendicular to the plane of the page in FIG. 5 so that its projection into the image plane is co-aligned with the linear photosensitive column 16 of the sensor 10a which is oriented orthogonal to the page as well. The transmitted beam and received beam are shown using a common aperture approach. System tradeoffs such as scanner complexity and minimum blind range may require the use of a separate close proximity apertures for transmit and receive beams.

The received energy is imaged onto the sensor's linear detector column 16 by means of one or more spherical optic elements (illustrated in FIG. 5 as a single imaging optic 56). The beam shaping optics for the transmitted laser beam include both spherical and cylindrical elements to shape the desired axially asymmetric beam.

Although the type of scanning of the system shown in FIG. 5 does not allow full 360 degree panoramic coverage by a single laser, it is most useful for applications in which the region of interest only includes a partial azimuth sweep on the order of 45 degrees. If desired, multiple independent sensor systems of this type could be used to cover a full 360 degrees of azimuth angle.

Figure 6:
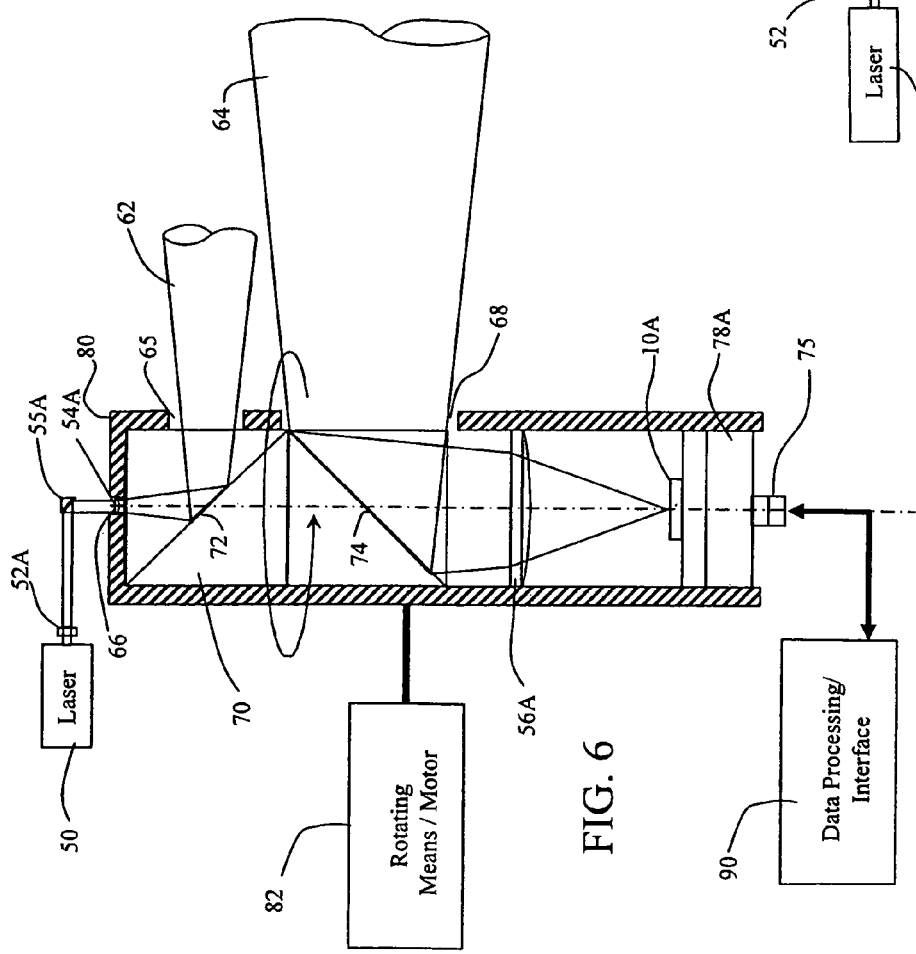
FIG. 6 is a schematic illustration of a second flash ladar system according to the present invention.

In FIG. 6, a rotating prism type scanner system is used in conjunction with the sensor 10a of FIG. 1. The rotating scanner 70 is affixed to a rotatable housing 80 rotated by a motor 82. A first side 72 of the scanner 70 reflects a laser beam received from laser 50. An aperture 66 in the rotatable housing 80 allows the laser beam to be directed from optical lens 52A, to reflecting optical member 55A, to optical element 54A which focuses the laser beam on side 72 of the scanner 70. Upon being reflected from the surface of side 72 the fanned laser beam is projected through aperture 65. Aperture 68 positioned on the rotating housing below aperture 65 allows the light from the sensor's filed of view 64 to be reflected off the second side 74 of the scanner 70 whereupon the light passes through imaging optics 56A and is directed on to the sensor 10a. (Light filters in aperture 68 are not shown).

The sensor 10a and the sensor electronics 78A are attached to the rotating housing so that the sensor chip and scanner 70 are rotated together. A fiber optic rotary joint 75 or high speed slip rings allow the signals from the sensor to be sent to a data processor 90. The rotating scanner assembly of FIG. 6 allows the sensor to cover a full 360 degrees of azimuth angle.

Figure 7:
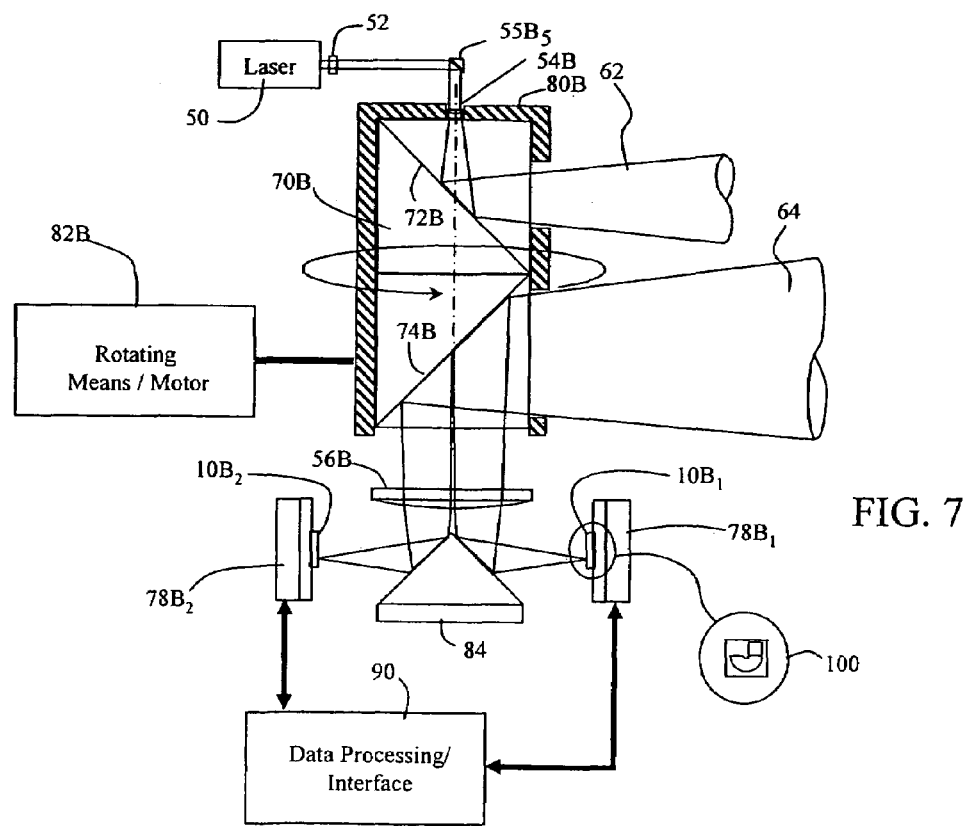
FIG. 7 is a schematic illustration of a third flash ladar system according to the present invention.

FIG. 7 demonstrates a scanner system which allows for coverage of an entire 360 degree azimuth angle without need of rotating the sensor. A rotating housing 80B driven by motor 82B has a scanner 70B attached thereto. A laser 50 generates a laser beam that passes through optical lens 52B and is reflected by optical element 55B through optical member 54B so as to project onto side 72B of the scanner 70B. The laser beam is reflected from side 72B of the scanner so as to form a transmitted beam 62. The second side 74B of the scanner 70B receives light from the sensors' field of view 64.

Light from the field of view 64 is reflected from side 74B and is directed through imaging optics 56B and onto a double facet mirror 84 which splits the light from field of view 64 in half and directs one half to sensor $10B_1$ and the other half to sensor $10B_2$.

Sensors $10B_1$ and $10B_2$ are the type of sensor depicted in FIG. 4. Each of the sensors is provided with its respective sensor electronics $78B_1$ and $78B_2$ that connect to data processor 90. In that the photosites of the sensors have a semi-circular arc width, this geometry ensures that the imaged fan beam is always projected onto a detector array regardless of scan direction. Further, the geometry of the arch-type sensors preserves the mapping of object space elevation voxels to image plane detector pixels across 180 degrees of scan angle.

Thus, by utilizing two such sensors, a full 360 degree panoramic of coverage is realized. In that the reflected energy is split between the two sensors any redundant range profile data is taken into account by the software of the data processor 90.

The sensor chips of the present invention can be manufactured using manufacturing techniques employed in conventional CCD technology. The number of pixels in the photosensitive region and the number of rows and columns in the charge storage region are determined by the desired application of the sensor.

The present invention can be applied to a host of multiple pulse line scanning applications. The present invention can be used as a close-in automated protection system to detect and measure the position of incoming hostile missiles so that a countermeasure can be used to defeat the munitions before impact. The invention has particular benefits for defending against rocket propelled grenade attacks on lightly armored and unarmored vehicles employed by the military. The sensor of the present invention is capable of providing a full panoramic coverage at frame rates that are fast enough to allow a self defense countermeasure to be employed. Further, the present invention can be used for collision avoidance of automobiles. In automotive applications, an effective collision avoidance system could be implemented without the need of full panoramic coverage so that a system such as the one demonstrated in FIG. 5 could be utilized.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A flash ladar system, comprising:
a laser for generating a fan-beam pulse;
optical means for directing the fan beam pulse;
scanning means for receiving the fan-beam pulse from said optical means and directing the fan-beam pulse toward a calibrated vertical strip of space;
a sensor having a photosensitive region oriented with a singular axis;
reflecting means for reflecting light, the reflected light resulting from the fan-beam pulse striking an object in the calibrated vertical strip of space, said sensor receiving the reflected light from said reflecting means; and
wherein said singular axis is a column of photosensitive pixels, said sensor having a charge storage matrix with each row of said charge storage matrix directly connecting to a corresponding pixel of said column of photosensitive pixels.

2. A flash ladar system according to claim 1, further comprising data processing means for processing signals outputted by said sensor.

3. A flash ladar system, comprising:
a laser for generating a fan-beam pulse;
optical means for directing the fan beam pulse;
scanning means for receiving the fan-beam pulse from said optical means and directing the fan-beam pulse toward a calibrated vertical strip of space;
a sensor having a photosensitive region oriented with a singular axis;
reflecting means for reflecting light, the reflected light resulting from the fan-beam pulse striking an object in the calibrated vertical strip of space, said sensor receiving the reflected light from said reflecting means; and
wherein said singular axis includes a radial focal point, said sensor having a charge storage matrix with each row of said charge storage matrix directly connecting to a corresponding photosensitive arc.

4. A flash ladar system according to claim 3, further comprising: imaging means for optically imaging the reflected light onto said sensor.

5. A flash ladar system comprising:
a laser for generating a fan-beam pulse;
optical means for directing the fan beam pulse;
scanning means for receiving the fan-beam pulse from said optical means and directing the fan-beam pulse toward a calibrated vertical strip of space;
a sensor having a photosensitive region oriented with a singular axis;
reflecting means for reflecting light, the reflected light resulting from the fan-beam pulse striking an object in the calibrated vertical strip of space, said sensor receiving the reflected light from said reflecting means;
a rotatable housing that houses said optical means and said scanning means, said optical means and said scanning means rotating with said rotatable housing, said scanning means comprising one side of a scanner, and said reflecting means comprising a second side of said scanner;
a double facet mirror for receiving light reflected from said second side of said scanner; and wherein one side of said double facet mirror directs the reflected light to said sensor and a second side of said double facet mirror directs a second stream of reflected light to a second sensor.

6. A flash ladar system according to claim 5, further comprising:
means for rotating said rotatable housing.

7. A flash ladar system according to claim 5, further comprising:
sensor electronics connected to said sensor.

8. A flash lader system according to claim 7, further comprising:
a rotatable housing that houses said optical means, said scanning means, said imaging means, said sensor and said sensor electronics; said optical means, said scanning means, said imaging means, said sensor and said sensor electronics connecting to and rotating with said rotatable housing.

9. A flash ladar sensor according to claim 5, wherein said rotatable housing has a first aperture for allowing the optical means to direct the fan-beam pulse to the scanning means, said rotatable housing having a second aperture to allow the scanning means to direct the fan beam pulse to the calibrated strip of space, said rotatable housing having a third aperture for allowing the reflected light to enter the rotatable housing and strike said reflecting means.

10. A flash ladar system, comprising:
a laser;
an optical arrangement for directing a beam generated by said laser in a desired direction;
a scanner having a side for directing the beam received from the optical arrangement toward an object to be scanned;
a reflector that comprises a second side of said scanner for receiving light generated as a result of the beam striking the object and then reflecting the light;
a sensor that receives the light reflected by said reflector; said sensor having a single column of photosensitive pixels, said sensor having a charge storage array having a plurality of charge storage pixels arranged in a matrix, each photosensitive pixel of said single column of pixels being connected to a corresponding row of said charge storage array;
imaging optics for directing the light reflected by said reflector to said sensor;
a rotatable housing including means for rotating, said rotatable housing containing said scanner, said imaging optics and said sensor, said scanner, said imaging optics and said sensor rotating with said rotatable housing; and
fiber optic connecting means for connecting said sensor to a data processor.

11. A flash ladar system, comprising:
a laser;
an optical arrangement for directing a beam from said laser in a desired direction;
a scanner for receiving the beam from said optical arrangement and directing the beam toward an object to be scanned;
a reflector for receiving the light generated as a result of the beam striking the object and then reflecting the received light as a reflected light stream;
a rotatable housing having means for rotating, said scanner and said reflector being affixed to said rotatable housing and rotating therewith;
splitting means for splitting the reflected light stream received from said reflector into a first stream and a second stream;
a first sensor for receiving the first stream from the splitting means and a second sensor for receiving the second stream from the splitting means; and
data processing means connecting to said first and second sensors; and
wherein said first sensor has a photosensitive region comprising a plurality of photosensitive paths that are positioned at different radial distance from a radial focal point, each path of the plurality of photosensitive paths being directly connected to a corresponding row of a charge storage matrix, said first sensor being a CCD device.

* * * * *